Jan. 17, 1950 J. C. CASE ET AL 2,494,642
CORRUGATING MOLD
Filed June 12, 1945 3 Sheets-Sheet 1
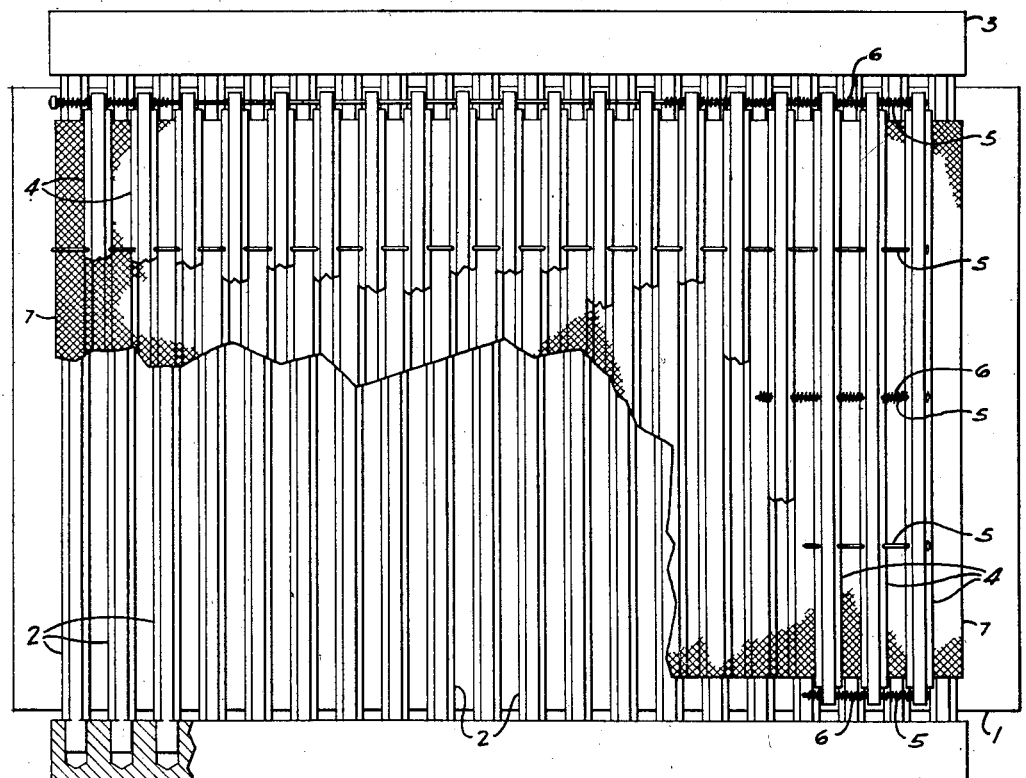
Fig. I
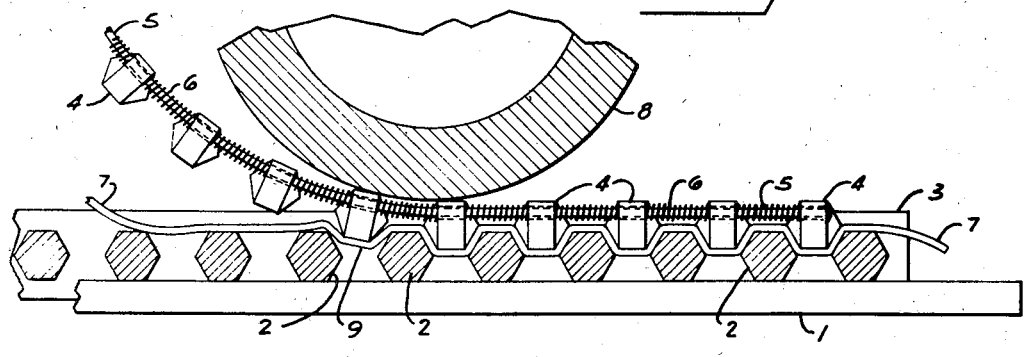
Fig. II
Leonard S. Meyer
John C. Case
INVENTORS
BY
Marshall & Marshall
ATTORNEYS Jan. 17, 1950
J. C. CASE ET AL
2,494,642
CORRUGATING MOLD
Filed June 12, 1945
3 Sheets-Sheet 2
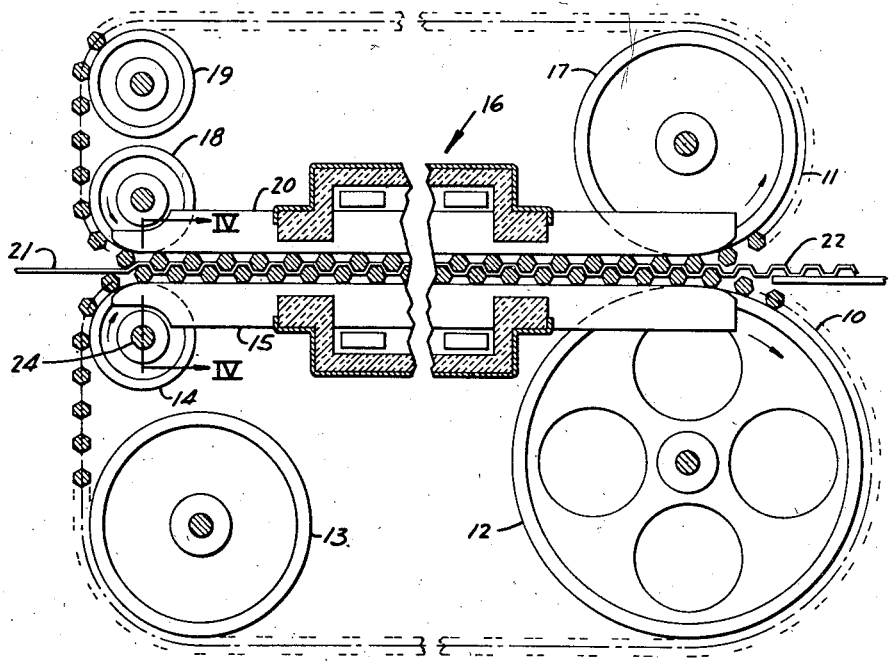
Fig. III
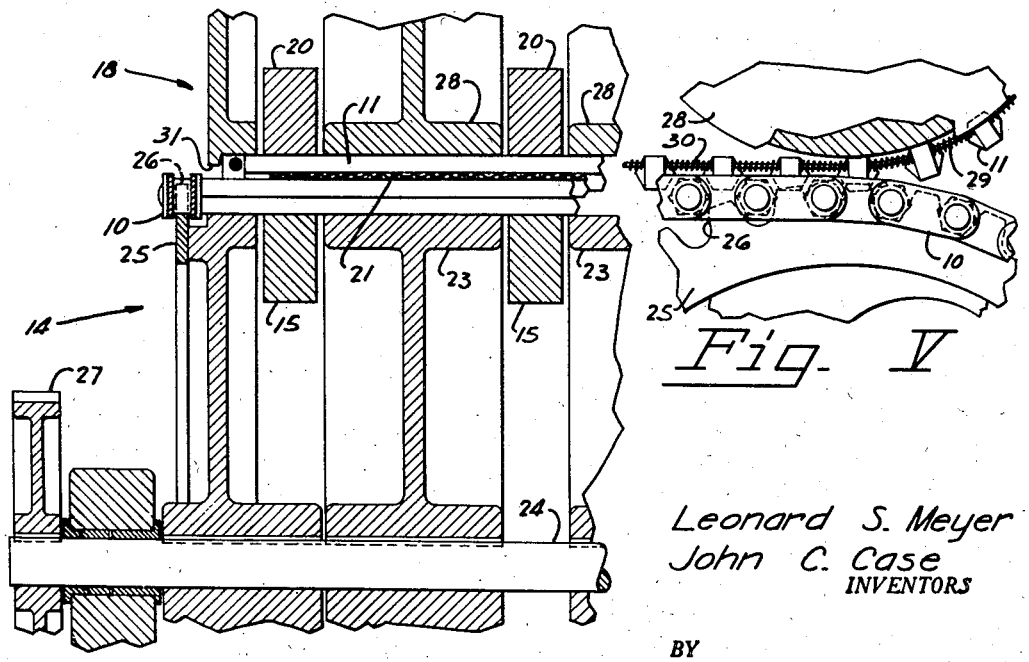
Fig. IV
Fig. V
Leonard S. Meyer
John C. Case
INVENTORS
BY Marshall & Marshall
ATTORNEYS Jan. 17, 1950
J. C. CASE ET AL
2,494,642
CORRUGATING MOLD
Filed June 12, 1945
3 Sheets-Sheet 3
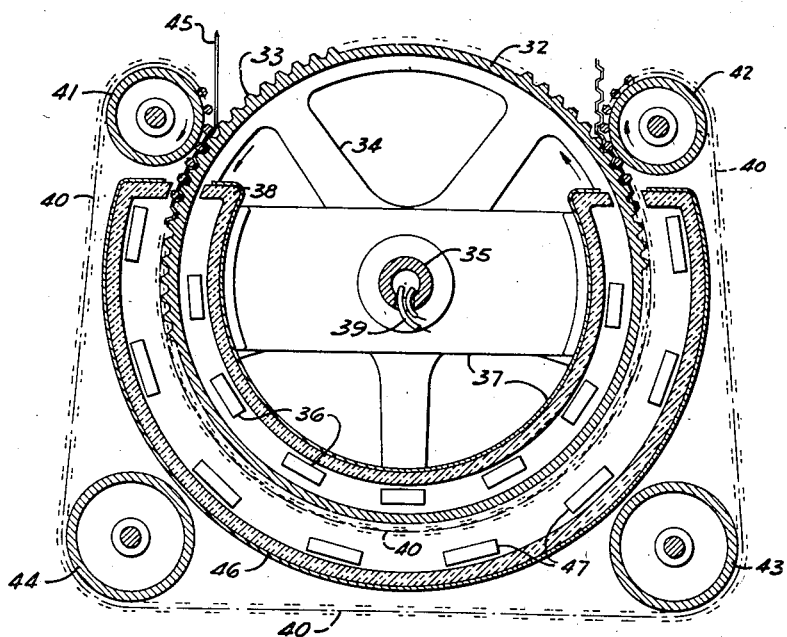
Fig. VI
Leonard S. Meyer
John C. Case
INVENTORS
BY
Marshall & Marshall
ATTORNEYS Patented Jan. 17, 1950

2,494,642

UNITED STATES PATENT OFFICE 2,494,642

CORRUGATING MOLD

John C. Case and Leonard S. Meyer, Toledo, Ohio, assignors to Libbey-Owens-Ford Glass Company, Toledo, Ohio, a corporation of Ohio Application June 12, 1945, Serial No. 599,090

15 Claims. (Cl. 154—30)

The present invention relates to apparatus for manufacturing a construction material having a high ratio of strength to weight and in particular to a mold adapted to perform one of the operations in manufacturing such a material.

A structural material having great strength and rigidity in proportion to its weight may be produced from a resin impregnated fabric by first forming a honeycomb structure, the cell walls of which are formed of the impregnated material, and then gluing slices of the honeycomb structure between flat sheets of the fabric. A resin impregnated fabric has relatively great strength in tension or compression but, being thin, is relatively weak in bending. Therefore, when sheets of the fabric are spaced apart and prevented from buckling by the honeycomb core sandwiched between them they are subject to tension or compression only and the resulting structure is very stiff.

Fabric made of glass fiber is one of a number of materials peculiarly adapted for use in forming such a high-strength structure. When glass fiber fabric is used, a thermosetting resin adhesive consisting of a polymerizable unsaturated polyester or a diallyl ester may be used to impregnate the fabric and to join the slices of honeycomb structure to the flat sheets to form a composite high-strength structure.

Although glass fiber fabric is preferred because of its great strength, heat resistance, dimensional stability and non-hygroscopic nature, other fabrics formed of cotton, silk, or wool impregnated with a thermosetting resin such as urea-formaldehyde, phenol-formaldehyde or melamine-formaldehyde resin may be used.

The principal difficulty in manufacturing a composite structure having a honeycomb core lies in the manufacture of the core itself. One method of forming the core is to corrugate a number of sheets of the material and then glue the sheets together with the corrugations in registry so as to produce a substantially honeycomb assembly. Such an assembly can then be sliced transversely to the axis of the cells to form the core material for the final composite structure. The dimensional stability of cloth made of glass fiber makes such cloth difficult to corrugate. Added to this difficulty is the additional problem that the impregnating resin must be hardened while the fabric is held in the corrugating mold.

The principal object of this invention is to provide a mold for corrugating a resin impregnated fabric, which mold will not introduce an undesirable tensile stress in the fabric during the corrugating operation.

Another object is to produce a mold for corrugating a resin impregnating fabric which will support a substantial area of the fabric during the time required for the impregnating resin to harden.

A still further object is to produce a corrugating mold in which the elements of one part of the mold have sufficient individual freedom to permit them to accommodate small irregularities in the other mold or in the material being corrugated.

These and more specific objects and advantages are attained by the invention, examples of which are shown in the accompanying drawings.

In the drawings:

Figure I is a plan view, with parts broken away, showing a simple mold embodying the principles of the invention.

Figure II is a vertical section at an enlarged scale showing the cooperation of the mold halves in corrugating an impregnated material.

Figure III is a vertical section showing a continuous mold embodying the principle of the invention.

Figure IV is a fragmentary vertical section taken substantially along the line IV—IV of Figure III.

Figure V is an enlarged fragmentary detail showing the engagement of the continuous mold halves illustrated generally in Figure III.

Figure VI is a vertical section of another form of continuous mold.

These specific figures and the accompanying description are intended merely to illustrate the invention but not to impose limitations upon the claims.

According to the invention a mold suitable for corrugating a resin impregnated fabric may be formed of two series of parallelly disposed, spaced rods or of one series of rods and a suitably grooved plate or roll, or of a pair of corrugated surfaces one of which is flexible in a direction transverse to the corrugation, which when used are adapted to partially intermesh so as to corrugate a material engaged between them. Because of the non-stretchable nature of some of the impregnated fabrics to be corrugated, one of the molds is made in the form of a chain-like grid which may be rolled up or unrolled over the cooperating grid. By successively forcing the bars or ridges of the chain-like grid into the spaces of the other grid the fabric is neatly formed to the contour of one ridge and groove of the grid before the succeeding ridges contact the fabric and stretch it into the grooves. The use of ordinary corrugating rollers is impractical for corrugating glass fabrics because of the high tensile forces introduced as the material is stretched to conform to the teeth of the rollers.

Another form of the invention comprises a pair of chain grids adapted to run over guide pulleys and along a track. The guide pulleys are so arranged that the chains partially intermesh to mold the material into corrugated form and to hold the material in that form as the chains pass along the guide tracks.

In either form of the invention the material may be held firmly in the mold for a sufficient time to secure adequate hardening of the resin without making the process too slow for practical use.

A simple mold constructed according to the invention comprises a base plate 1 on which a grid formed of a plurality of hexagonal rods 2 held in end bars 3 is laid. The bars 2 are oriented so as to present flat faces to the base plate 1 and are held from rotating by contact with the base plate 1. An upper mold adapted to cooperate with the lower mold is formed of a series of hexagonal rods 4 strung on flexible guide wires 5 and spaced from each other by coil springs 6 so that the individual bars 4 of this grid are resiliently held in parallel alignment to form a chain-like grid which may be rolled or unrolled over the stationary grid of hexagonal bars 2. Inasmuch as the rods 2 do not move the lower grid may be made from a single plate by cutting transverse grooves in it corresponding to the spaces between the rods 2.

In operation a sheet of impregnated fabric 7 is laid over the lower grid bars 2 and the upper flexible grid is positioned with its end bar over the space between the end bar and the next adjacent bar of the lower grid. A heavy roller 8, which may be a section of steel tubing, is then rolled over the bars 4 to successively force them into the spaces between the lower bars 2.

To obtain satisfactory performance in this method of corrugating, the roller 8 must be of comparatively small diameter and the upper grid must be flexed sharply enough so that as the roller is advanced each corrugation is substantially formed before the material is caught between the succeeding pairs of bars. If this is not done, for example if too large a roller is used, the fabric is caught between cooperating bars of the grids before the preceding corrugations are fully formed, this having the effect of stretching the material around the edges of the bars. While some materials have sufficient elasticity to stand such stretching other materials would be torn before they would shape themselves over the bars.

The engagement of the flexible upper grid with the lower grid is illustrated in Figure II. One of the bars 4 is shown forming a corrugation 9 between two of the bars 2. As the engagement proceeds and the corrugation 9 is pressed into the space between the lower bars 2 the fabric 7 is freely drawn over the edge of the next bar 2 until the succeeding one of the rods 4 engages its upper surface to start the next corrugation. When this next rod presses the material down the preceding rod pulls the material tight over the top of the intervening bar 2 thus forming the upper part of a corrugation. It is this latter engagement of the succeeding bar which must be postponed as long as possible to prevent injuriously stretching the fabric.

Once the engagement of one bar is completed and the roller 8 has moved on to the next very little pressure is required to hold the material in the corrugated form. The weight of the flexible grid is usually sufficient for this purpose.

After the flexible grid has been completely engaged with the lower grid the mold is put in a heated oven or a heating press to harden the resin carried in the fabric 7.

The grid of parallel, spaced rods is only one form of flexible mold member. A suitably corrugated thin metal sheet is equally satisfactory. Such a corrugated sheet satisfies the essential requirement of being flexible in a direction transverse to the corrugations.

While this simple form of mold is entirely satisfactory for laboratory use or for the production of small quantities of corrugated material it is too slow for general use. The principle of the invention may be incorporated in a continuous mold by making the grids in the form of conveyor chains 10 and 11. The lower chain 10 is carried over a large pulley 12 and a pair of smaller pulleys 13 and 14. After leaving the pulley 14 the chain grid 10 is carried on the upper surface of guide rails 15 which extend through a heating oven 16. The length of the heating oven 16 and the speed of the chain grid 10 can be adjusted to secure whatever interval of time is required for satisfactory hardening of the resin. The other chain grid 11 is carried over a large diameter pulley 17 and a pair of small diameter pulleys 18 and 19. After it leaves the pulley 18 it runs along the bottom of guide rails 20 extending parallelly to and above the guide rails 15.

The pulleys 14 and 18 over which the chain grids 10 and 11 run just prior to entering the space between the guide rails 15 and 20 are firmly pressed together so that a sheet of resin impregnated fabric 21 will be accurately formed to the contours of the rods forming the chain grids in the same manner as the rods 4 formed the corrugations 9 between the bars 2 of the simple mold. After the material 21 has been firmly pressed into corrugations the chain grids 10 and 11 carry it through the oven 16 and it finally emerges as a corrugated strip 22. The pressure required to hold the material in the mold form as it passes through the oven is not great enough to cause serious friction between the bars of the chain grids and the guide rails 15 and 20. In order that the chain grid 10 may be adequately supported as it leaves the pulley 14 the pulley 14 is divided into a series of narrow faced pulley sections 23 spaced along a supporting shaft 24. The end sections of the pulley 14 are provided with annular sprockets 25 whose teeth 26 are adapted to drive the chain grid 10. The shaft 24 may be driven in any conventional manner, as from a motor driving through a train of gears terminating in a gear 27 keyed on the end of the shaft 24.

The pulley 18 is divided into sections 28 spaced apart in the same manner as the sections 23. Spacing the pulley sections allows the ends of the guide rails 15 and 20 to extend past the center line between the pulleys 14 and 18 and thus pick up the chain grids as soon as they pass the center line and thereby avoid any spreading or tendency to release the material being molded.

The chain grid 11 may consist of either a conventional chain arrangement or it may be a series of bars strung on wires 29 and resiliently separated from each other by springs 30. If the chain grid 11 is formed in the latter manner the individual bars thereof are free to accommodate themselves to small irregularities in the lower chain grid 10 or in the material being molded.

In this latter embodiment the lower chain grid 10 is driven by the sprocket 25 whose teeth 26 engage the ends of the bars of the grid. The upper chain grid 11 is driven solely by its engagement with the lower grid and is prevented from straying sidewise by flanges 31 on the end sections pulley 18.

In this form of the invention the chain grids engage each other as they come around the small diameter pulleys 14 and 18. The resulting engagement to form one corrugation is therefore substantially completed before the material is contacted by the next bars and thus there is very little tendency to stretch the material as it is formed to the outlines of the grid bars. If, with practical sizes of sprockets and pulleys, it is still found that undesirable stretching takes place this may be somewhat decreased by raising the material contacting portions of the rods from the pitch line of the chains. This has the effect of increasing the velocity of the material contacting portions of the bars as they run over the pulley 14 and the pulley 18 so that they tend to draw in enough fabric to form the corrugations without substantially stretching it.

Corrugating molds embodying the principles of the invention may be used with many materials requiring an appreciable time to harden or take a permanent set to the shape of the mold. Ordinary corrugating rollers, when made small enough to avoid stretching the material over the teeth of the rolls are in contact with the material over a very short arc and must therefore be operated very slowly. These difficulties are entirely overcome by using the chain grid type of mold.

If it is desired to form other shapes of corrugations than the semi-hexagonal form shown in the drawings it is a simple matter to alter the bars of the molds accordingly.

In the first example the lower part of the mold was a rigid assembly of spaced bars while the upper part was a flexible chain grid adapted to cooperate with the rigid grid in corrugating the resin impregnated fabric. In that example it is immaterial whether the lower grid is a rigid assembly of bars or is a grooved plate in which the ridges between the grooves take the place of the bars. In the second example two chain grids running over pulleys and between guide rails are employed as a corrugating mold. The features of a rigid mold as shown in the first example and a continuous chain grid as shown in the second example may be combined in a continuous mold. A third example embodying this combination of features is shown in Figure VI. In this example the lower mold consists of a cylindrical drum 32 having teeth 33 formed on its periphery which correspond in function and shape to the rods of the lower grid in the first example or one of the chain grids in the second example. The cylindrical drum 32 is supported at its ends on spiders 34 which are journaled on a stationary hollow shaft 35. The cylindrical drum 32 is heated from within by a series of electrical resistance heaters 36 mounted in a framework 37 carried on the stationary shaft 35. The framework 37 includes a layer of heat insulating material 38 to confine and direct the heat to the cylindrical drum 32. The stationary shaft 35 is hollow so that lead wires 39 connected to the heating elements 36 may be easily brought out.

The other half of the mold is in the form of a continuous chain grid 40 trained over a series of pulleys 41, 42, 43 and 44 and about two-thirds of the periphery of the cylindrical drum 32. This arrangement allows the impregnated fabric 45 to be fed into the space between the drum 32 and the chain grid 40 as the latter comes around the pulley 41 and to be formed to the contour of the teeth 33 and the rods comprising the chain grid 40. The pressure exerted between the pulley 41 and the drum 32 is sufficient to accurately form the material into shape. Rotation of the drum 32 carries the formed material through a semi-cylindrical oven 46 heated by resistance elements 47. During its passage through the oven 46 the material is held in contact with the cylindrical drum 32 by the chain grid 40. At the outlet end of the oven 46 the chain grid 40 runs over the pulley 42 thus releasing the corrugated material from the teeth 33 and the bars of the chain grids 40.

This mold is an improvement over the mold shown in the second example in that it eliminates the sliding friction between the chain grids and the guide rails employed to keep the chain grids in mesh as they pass through the oven. In this third example the chain grid is wrapped on the exterior of a drum so that its tension supplies sufficient radial force to keep it in mesh and to hold the material while the resin hardens.

The examples illustrating the invention show various combinations of elements adapted to corrugate resin impregnated fabric. In each embodiment of the invention one of the mold elements is a chain-like grid which is flexible in at least one direction. The cooperating grid may be either flexible or rigid. Each of the examples provides means for holding the material in the corrugating mold for a substantial time interval which is long enough to permit hardening of the impregnating resin.

Having described the invention, we claim:

1. A mold for corrugating resin impregnated fabric comprising a plurality of rods disposed in two series, the rods of the first series being rigidly held in spaced parallel alignment, and the rods of the second series being resiliently held in spaced parallel alignment, said second series of rods being adapted to press the fabric into the spaces between the rods of the first series.

2. A mold for corrugating resin impregnated fabric comprising a grid of parallel rigidly supported rods, and a plurality of resiliently spaced, flexibly mounted rods adapted to be unrolled onto said grid with the rods of each grid entering the spaces of the other so as to mold a fabric to the outline of the rods.

3. A mold for corrugating resin impregnated fabric comprising a grid of parallel rigidly supported hexagonal rods oriented to present a flat upper surface, a second flexible grid of parallelly disposed, resiliently spaced hexagonal rods oriented to present a flat surface, the rods of each being spaced so that material being molded will conform to three sides of each rod.

4. A mold for corrugating resin impregnated fabric comprising a flat grid formed of a series of parallelly disposed rods supported on a base, a flexible grid of parallel resiliently spaced rods adapted to be unrolled onto said first grid to press a fabric into the spaces between the rods.

5. A mold for corrugating resin impregnated fabric comprising a flat grid formed of a series of parallelly disposed hexagonal rods supported on a base, a flexible grid of parallel resiliently spaced hexagonal rods adapted to be unrolled onto said first grid to press a fabric into the spaces between the hexagonal rods.

6. A mold for corrugating resin impregnated fabric comprising a flat grid formed of a series of parallelly disposed rods, each rod presenting a flat upper face and a pair of flat flanking faces, a flexible grid formed of a series of parallelly disposed, resiliently spaced rods, each rod presenting a flat face flanked with two inclined faces, said rods of one grid being adapted to fit between the rods of the other grid with the flanking faces in juxtaposition.

7. A mold for corrugating resin impregnated fabric comprising a chain grid of parallelly disposed, rigidly spaced rods, a cooperating grid of resiliently supported and spaced rods adapted to mold a material into the spaces of the first grid.

8. A mold for corrugating resin impregnated fabric comprising an endless chain grid of parallelly disposed rigidly spaced rods, a second chain grid of resiliently spaced parallel rods, and means for pressing the rods of said second grid into the spaces of the first grid during a portion of their travel whereby a fabric carried by said chain grids is molded to the contour of the rods.

9. A mold for corrugating resin impregnated fabric comprising a grid of spaced parallel rods forming one part of the mold, and a cooperating chain grid of parallel rods adapted to press material into the spaces between the rods of the first grid to form the material to the contour of the rods.

10. A mold for corrugating resin impregnated fabric comprising mating members, one of which consists of a grid of resiliently connected and spaced parallel rods, which grid is flexible in a direction transverse to its length and to the length of the rods.

11. A mold for corrugating resin impregnated fabric comprising a grid-like surface and a grid of spaced parallel rods that is flexible in at least one direction and is adapted to press material into the spaces of the grid-like surface.

12. A mold for corrugating resin impregnated fabric comprising a grid-like surface forming the periphery of a cylinder, and a chain-like grid adapted to wrap part way around the cylinder with the bars of the grid meshing in the spaces of the grid-like surface.

13. A mold for corrugating resin impregnated fabric comprising a grid-like surface formed on the periphery of a rotatable cylinder, and a chain-like grid mounted on pulleys and adapted to wrap part way around the cylinder with the bars of the grid meshing in the spaces of the grid-like surface.

14. A mold for corrugating resin impregnated fabric comprising mating members, one of which members presents a corrugated surface the elements of which are resiliently spaced and which member is flexible in a direction transverse to its length and to the corrugations.

15. A mold for corrugating resin impregnated fabric comprising mating members, one of which members is rigid and presents a corrugated surface, the other of which members presents a corrugated surface having resiliently spaced elements adapted to mesh with the rigid member and which member is flexible in a direction transverse to its length and to the corrugations.

JOHN C. CASE.
LEONARD S. MEYER.

REFERENCES CITED

The following references are of record in the file of this patent:

UNITED STATES PATENTS

| Number | Name | Date |
|---|---|---|
| 1,617,018 | Federhart | Feb. 8, 1927 |
| 2,022,082 | Fisher et al | Nov. 26, 1935 |
| 2,173,852 | Miller | Sept. 26, 1939 |
| 2,210,985 | Magnani | Aug. 13, 1940 |
| 2,350,996 | Atkinson et al. | June 13, 1944 |
| 2,376,915 | Haas | May 29, 1945 |